Jan. 12, 1971　　　F. E. DALTON　　　3,554,620
TRACK ROLLER ASSEMBLY
Filed Oct. 30, 1968

INVENTOR
FRANK E. DALTON
BY Lyon & Lyon
ATTORNEYS

United States Patent Office 3,554,620
Patented Jan. 12, 1971

---

3,554,620
TRACK ROLLER ASSEMBLY
Frank E. Dalton, 25909 Richfield Drive,
Torrance, Calif. 90505
Filed Oct. 30, 1968, Ser. No. 771,832
Int. Cl. F16c 33/78
U.S. Cl. 308—187.1
1 Claim

ABSTRACT OF THE DISCLOSURE

A track roller assembly for track-laying vehicles has a roller shell mounted on a stationary shaft by means of axially spaced bearings, and the inner races of the bearings are engaged at one end by elastomeric rings backed up by circular washers and split retainer rings mounted in grooves on the shaft. Sealing assemblies at each end of the roller shell each include a pair of annular clamping plates having outer peripheries engaging an O-ring mounted in a groove in the roller shell, and inner peripheries supporting a lip-type seal having rotary contact with the shaft.

---

This invention relates to track roller assemblies of the type employed for contact with endless tracks used on track-laying vehicles. Such track roller assemblies commonly employ a stationary shaft having a roller shell mounted thereon by means of axially spaced bearings. Sealing means are provided at opposite ends of the roller shell to prevent escape of lubricant for the bearing assemblies and to prevent intrusion of foreign matter. A roller assembly of this general type is shown in the Dalton Pat. 2,676,040 granted Apr. 20, 1954.

The present invention is directed to improvements in the mounting of the bearing assemblies and in the construction of the sealing devices for confining lubricant and excluding foreign matter. It is an important object of this invention to provide such a track roller assembly which requires a minimum of close-tolerance machined parts and which is particularly suited for economical manufacture on a quantity production basis. Additional objects and advantages will appear hereinafter.

Figure 1:
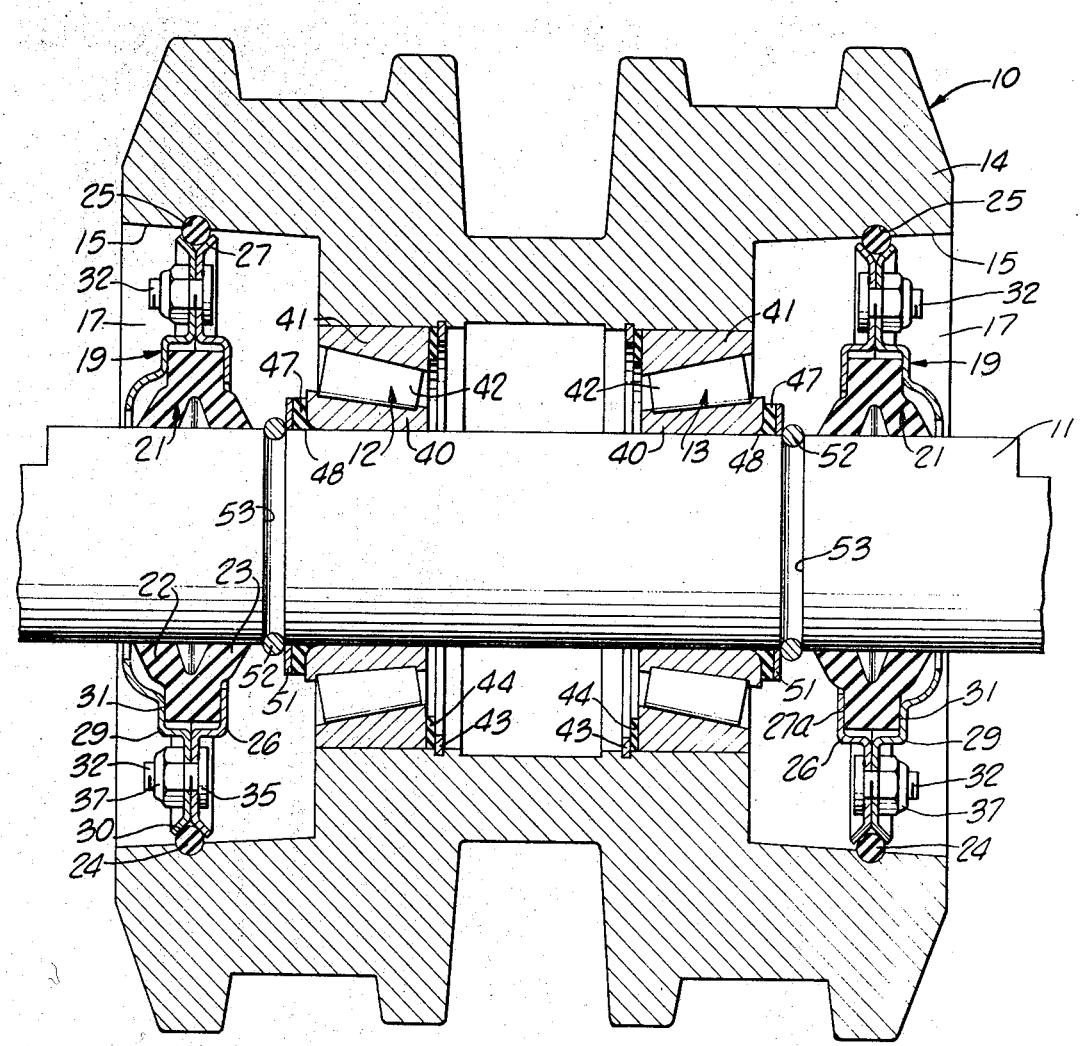
FIG. 1 is a transverse sectional view showing a preferred embodiment of this invention.

Referring to the drawings, the track roller assembly generally designated 10 comprises a stationary shaft 11 having a pair of axially spaced bearing assemblies 12 and 13 supporting a roller shell 14. The roller shell is provided with axially extending bores 15 at opposite ends thereof, each encircling a portion of the shaft to define annular recesses 17. Sealing assemblies generally designated 19 are provided in each of the recesses 17, and since these sealing assemblies are duplicates, only one need be described.

Each sealing assembly 19 includes an elastomeric lip-type seal ring 21 having a pair of lips 22 and 23 each forming a rotary seal with the surface of the shaft 11. Each assembly 19 also includes an elastomeric O-ring 24 which extends into a circular groove 25 provided in one of the bores 15 of the roller shell 14. A first annular clamping plate 26 has a bevel surface 27 adjacent its outer periphery engaging one side of the O-ring 24. This clamping plate 26 has a flange portion 27a near its inner periphery engaging a side surface of the lip-type sealing ring 21. A second annular clamping plate 29 has a bevel surface 30 near its outer periphery engaging the other side of the O-ring 24 and has a flange 31 which engages the other side surface of the lip-type sealing ring 21. Axially extending bolts 32 extend through aligned apertures 33 and 34 on the plates 26 and 29, respectively. A head 35 on each bolt 32 is secured to the clamping plate 26 by any convenient means, for example, by spot welding 36. A nut 37 is threaded on each bolt 32 to clamp the plates 26 and 29 together and thereby confine the elastomeric rings 24 and 21 between them. When the nuts 37 are tightened, each of the rings 24 and 21 are firmly clamped and are held against movement with respect to the clamping plates.

The bearing assemblies 12 and 13 are duplicates. Each is provided with an inner race 40, an outer race 41, and a plurality of roller elements 42 positioned therebetween. A split retainer ring 43 and an elastomer spacer ring 44 provide lateral support for the outer race 41. The inner race 40 has a curved relief portion adjacent its outer end defining a space between the race 41 and the shaft 11. An elastomeric ring 47 has an inner projection 48 initially shaped to fit this space. A washer 51 engages the hub and also engages a split retainer ring 52 mounted in a groove 53 formed in the shaft 11.

Assembly of the parts of the track roller assembly is accomplished by placing the split retainer rings 43 and the elastomeric washers 44 in position and then pressing the outer races 41 into place. One of the split retainer rings 52, washers 51 and elastomeric rings 47 are assembled in place on the shaft 11, along with the adjacent inner race 40 and roller element 42. The shaft 11 is then inserted into the interior of the roller shell 14 to bring the roller elements 12 into contact with the outer race 41. The parts of the other bearing assembly are then installed in position within the roller shell, and the other split ring 52 is installed in its groove 53. The projection 48 on each elastomeric ring 47 prevents the ring from being extruded radially outward under any endwise forces developed between the inner race 40 and the nearby washer 51.

Figure 2:
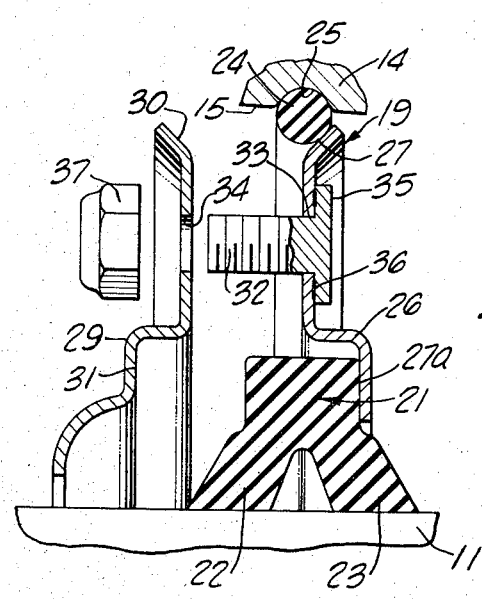
FIG. 2 is a sectional detail shown on an enlarged scale, and illustrating parts in the process of assembly.

FIG. 2 shows how the seal ring assemblies 19 are assembled into place. The lip-type ring 21 and the annular clamping plate 26 are first placed in position around the shaft 11 and the O-ring 24 is then placed in position in its groove 25. The other clamping plate 29 is then brought into position, with the bolts 32 projecting through the apertures 34. The nuts 37 are then installed on the projecting ends of the bolts 32 and tightened to clamp the plates 26 and 29 together, thereby wedging the O-ring 24 into the groove 25 and insuring rotation of the seal ring 21 with the roller shell 14. It will be noted that the nuts 37 are accessible from the open ends of the recesses 15.

Having fully described my invention, it is to be understood that I am not to be limited to the details herein set forth but that my invention is of the full scope of the appended claim.

I claim:

1. In a track roller assembly, the combination of: a stationary shaft, a roller shell, axially spaced bearing assemblies supporting the roller shell for rotation on the shaft, the roller shell having axially extending bores at each end, each bore having an internal groove, and each bore encircling a portion of the shaft to define an annular recess, seal means in each recess, each seal means comprising an elastomeric lip-type seal ring having rotary contact with the shaft, an elastomeric O-ring engaging within the groove, a pair of relatively movable annular plates each having a peripheral wedge surface engaging said O-ring on opposite sides thereof, the plates having a plurality of aligned apertures, a plurality of clamping bolts, each extending through one pair of aligned apertures, respectively, each bolt having a head fixed to one of said plates, a nut on each bolt engageable with the other of said plates for clamping the plates together to distort said O-ring and to secure the lip-type seal ring between the plates, whereby the seal means is secured for rotation with the roller shell.

References Cited

UNITED STATES PATENTS

| | | | |
|---|---|---|---|
| 2,512,148 | 6/1950 | Gaines | 308—187.1X |
| 2,655,393 | 10/1953 | Cobb | 308—187.2X |
| 2,757,052 | 7/1956 | Spurgeon | 308—187.1 |
| 2,866,670 | 12/1958 | Harris | 308—187.1 |
| 3,017,228 | 1/1962 | Baechli | 308—187.1 |
| 3,169,809 | 2/1965 | Pendleton | 308—187.1 |
| 3,239,285 | 3/1966 | Madeira | 308—20 |
| 3,362,760 | 1/1968 | Sernetz | 308—187.1 |

FOREIGN PATENTS

| | | | |
|---|---|---|---|
| 1,208,143 | 2/1960 | France | 308—187.1 |
| 582,458 | 9/1958 | Italy | 308—187.1 |

FRED C. MATTERN, Jr., Primary Examiner

F. SUSKO, Assistant Examiner